United States Patent [19]

Morton et al.

[11] Patent Number: 5,087,379

[45] Date of Patent: * Feb. 11, 1992

[54] ULTRASONIC VIBRATOR TRAY PROCESSES

[75] Inventors: William E. Morton, Bridgeport; Harold V. Fairbanks, Morgantown; James Wallis, Morgantown, all of W. Va.; Raymond L. Hunicke, Roxbury; Joseph Krenicki, Danbury, both of Conn.

[73] Assignee: Lewis Corporation, Oxford, Conn.

[*] Notice: The portion of the term of this patent subsequent to May 3, 2005 has been disclaimed.

[21] Appl. No.: 488,275

[22] Filed: Mar. 2, 1990

Related U.S. Application Data

[60] Division of Ser. No. 189,361, May 2, 1988, Pat. No. 4,919,807, which is a continuation of Ser. No. 886,010, Jul. 7, 1986, Pat. No. 4,741,839.

[51] Int. Cl.$^5$ ............................................. B01D 33/03
[52] U.S. Cl. ................................. 210/748; 210/767; 210/319; 210/388; 209/437
[58] Field of Search ............... 210/748, 767, 388, 319; 209/437, 173, 174, 3, 5; 241/1; 134/1, 25.1

[56] References Cited

U.S. PATENT DOCUMENTS

| | | | |
|---|---|---|---|
| 2,812,063 | 11/1957 | Pratt | 209/437 |
| 2,905,455 | 10/1959 | Sasaki | 209/5 |
| 3,997,436 | 12/1976 | Stoev et al. | 209/426 |
| 4,000,086 | 12/1976 | Stoev et al. | 252/312 |
| 4,028,232 | 7/1977 | Wallis | 210/785 |
| 4,039,456 | 8/1977 | Stoev et al. | 210/388 |
| 4,060,481 | 11/1977 | Stoev et al. | 209/170 |
| 4,070,275 | 1/1978 | Stoev et al. | 209/44 |
| 4,088,716 | 5/1978 | Stoev et al. | 261/64.1 |
| 4,090,937 | 8/1978 | Stoev et al. | 210/180.1 |
| 4,109,874 | 8/1978 | Stoev et al. | 209/12 |
| 4,184,965 | 1/1980 | Stoev et al. | 210/388 |
| 4,194,922 | 3/1980 | Gransell et al. | 134/1 |
| 4,200,470 | 4/1980 | Pennekamp | 134/25.1 |
| 4,240,903 | 12/1980 | Stoev et al. | 209/437 |
| 4,267,046 | 5/1981 | Stoev et al. | 210/780 |
| 4,326,855 | 4/1982 | Cottell | 209/5 |
| 4,379,714 | 4/1983 | Stoev et al. | 209/5 |
| 4,521,302 | 6/1985 | Stone | 209/437 |
| 4,525,219 | 6/1985 | Jones | 134/1 |
| 4,537,599 | 8/1985 | Greenwald, Sr. | 209/3 |
| 4,556,467 | 12/1985 | Kuhn et al. | 210/748 |

OTHER PUBLICATIONS

The Way Things Work, An Illustrated Encyclopedia of Technology—Simon and Schuster, 1967, p. 208.
Ultrasonic Desliming and Upgrading of Ores, S. C. Sun and D. R. Mitchell, Mining Engineering—Jun. 1956.

Primary Examiner—Robert A. Dawson
Assistant Examiner—Wanda L. Millard
Attorney, Agent, or Firm—Ware, Fressola, Van Der Sluys & Adolphson

[57] ABSTRACT

Processes and apparatus for treatment of flowing slurries of particulate material mixed in liquid employ a wide, elongated downwardly-slanted, metal tray with upturned edge flanges, cable-suspended for unrestrained vibratory flexing and undulation. The tray is provided with a plurality of ultrasonic transducers mounted on its underside, and the flowing slurry is delivered to the upper tray end, flowing lengthwise down the tray in a shallow flowing sheet. Ultrasonic vibratory energy coupled through the tray to the flowing slurry has a "microscopic scrubbing" action on all particles and agglomerates, breaking the surface tension on the particle, cleaning particle surfaces, and separating different constituent particles and coatings of gels, slimes, algae, clay or mud. Mixtures of fine particles of coal or other valuable minerals with ash, clay, rock or sand particles are separated with unexpected efficiency by these techniques. In a second embodiment, a second reflection tray is provided superimposed on the first tray.

20 Claims, 3 Drawing Sheets

FIG. 5
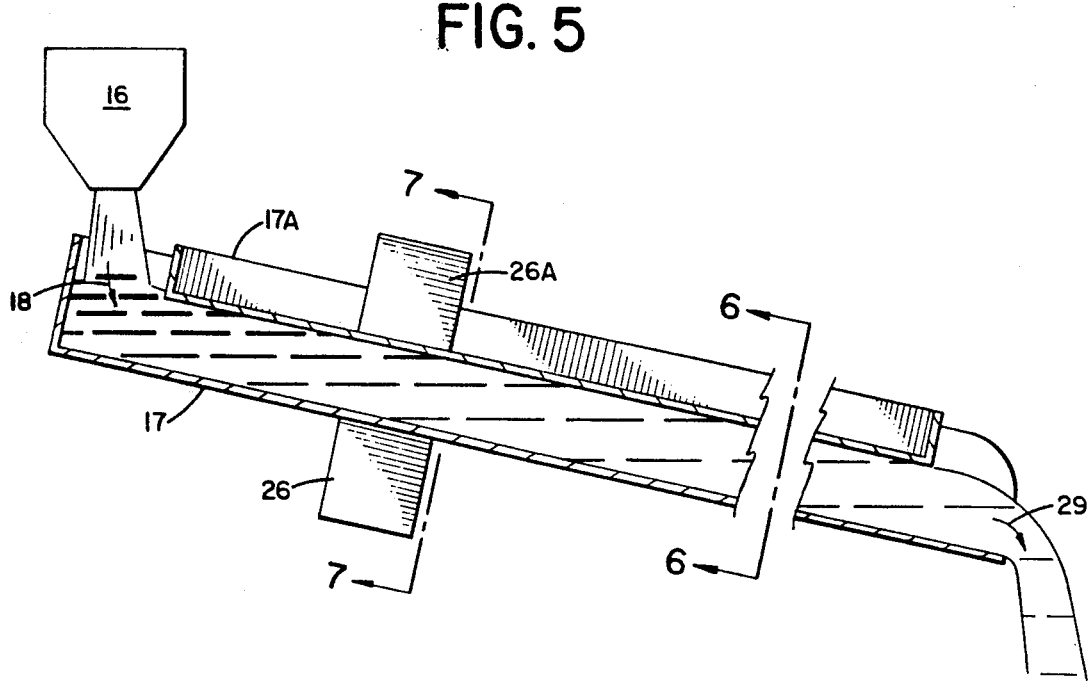
FIG. 6
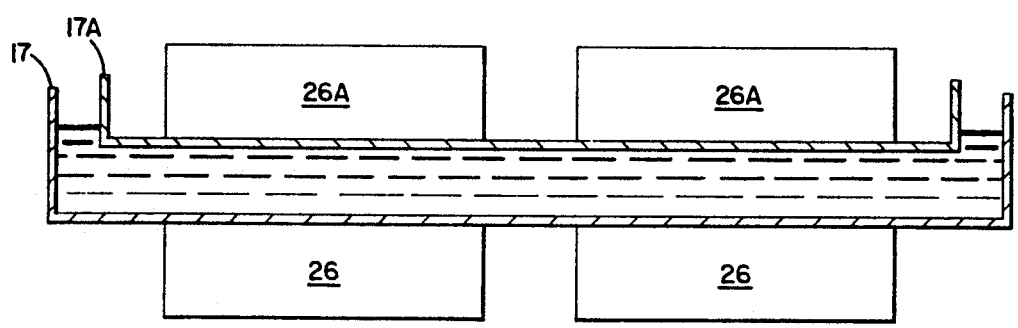
FIG. 7

ULTRASONIC VIBRATOR TRAY PROCESSES

CROSS REFERENCE TO RELATED APPLICATIONS

This application is a divisional of copending application Ser. No. 07/189,361 filed May 2, 1988 now U.S. Pat. No. 4,919,807, which is a continuation-in-part of U.S. Ser. No. 886,010 filed July 7, 1986, now U.S. Pat. No. 4,741,839 issued May 3, 1988.

BACKGROUND OF THE INVENTION

This invention relates to methods and apparatus for beneficiating crushed or granulated ores, and particularly to techniques for separating valuable minerals such as coal from less valuable ash, sand, clay or fine rock fragments.

In the Appalachian coalfields, conventional coal mining operations have traditionally refined useful coal by washing from it less valuable ash, sand and clay, although fine particles of coal are often agglomerated with these residues produced by coal washing processes. Throughout the coalfields, so-called "gob piles" and coal slurry ponds of residues that have accumulated adjacent to coal washing yards, comprising stock piles rich in fine particles of useful coal which have proved to be economically impractical to recover.

Various techniques have been proposed for recovering mineral fines from such crushed ores, such as the eccentric weight vibrators of U.S. Pat. Nos. 4,240,903; 4,267,046; 4,184,965; 4,039,456 and 3,997,436; the pneumo-hydraulic vibrators of U.S. Pat. Nos. 4,070,275; 4,088,716 and 4,060,481; and the Westinghouse Electric Corporation "Electrical Coagulation" techniques described in Coal Mining & Processing, September, 1982, pp. 64-67. These proposals are not believed to have achieved significant commercial success.

SUMMARY OF THE INVENTION

The techniques of this invention provide unexpectedly effective and economic methods and apparatus for beneficiating such crushed or granulated ores. In the case of coal gob piles and coal slurry ponds, they achieve surprisingly efficient recovery of valuable coal, while also improving the characteristics of the residue for densely packed back-filling of coal mining pits, open or underground, and filling the voids of the underground excavations to prevent subsidence, and reducing the settling times for ponds and settling basins to produce clarified wash water for recycling or other uses.

These multiple advantages are achieved through a novel technique by which the ore is mixed with approximately up to about thirty-five percent solids by weight and sixty-five percent by weight of water to create a slurry, which is delivered in a fast-flowing shallow sheet descending along an inclined thin sheet metal vibrator tray actuated by a plurality of ultrasonic transducers to produce standing wave patterns of ultrasonic vibrations. The vibrator tray is preferably suspended by flexible cables to maximize its flexural freedom to vibrate and undulate, and the vigorous vibratory energy thus imparted to the advancing slurry sheet produces rapid de-agglomeration and separation of ore from ash and other residues. A second tray can be superimposed on the first tray to permit reflection of the ultrasonic vibrations. Differing densities of the different types of particles reinforce the separation. Settling, centrifugal separators or screens achieve nearly complete recovery of the valuable coal fines.

The same novel technique can be used to separate gold and other valuable minerals from crushed ore, with equally successful results. In using the process of the present invention on the valuable mineral ore, minerals not soluble in water tend to cling to the valuable mineral particles. Various chemicals such as mercury, thiourea, cyanide or bromide can be added to the process to obtain better separation of the valuable mineral particles from the ore using amalgamation, leaching or agglomeration techniques. The vibrations clean the minerals from the valuable particles allowing the chemical additives to interact with them.

In using ultrasonics in connection with liquids, normally, cavitation will occur in liquids in the immediate vicinity of the ultrasonic transducers. This phenomenon can be called "direct cavitation" and is produced by transducer acceleration pressures against the liquid slurry. As these pressure waves radiate outward in the liquid slurry, they weaken to the point where they fall below the threshold of cavitation. While pressure waves can be transmitted long distances from transducers via metal transmission rods, the liquid slurry cavitation produced by such transmission lines is definitely limited to small points of application.

The embodiments of the present invention provide for broad transducers relying on the flexible properties of the suspended thin sheet metal trays acting as acoustic transmission lines. This phenomenon can be termed "flexural cavitation". With the transducers mounted near one end of the trays, an operating frequency is so chosen to create parallel washboard-like standing waves down the entire length of the sheet. When liquid slurry is flowed down the inclined trays, the slurry spurts upward as it passes through each parallel pressure ridge. Essentially, the trays have been transformed into a broad transducer that creates a flexural cavitation effect down its entire length.

Accordingly, a principal object of the present invention is to provide methods and apparatus for beneficiating ore slurries on an ultrasonic vibrator tray.

Another object of the invention is to provide such methods and apparatus capable of recovering mineral particles in useful quantities from ore mixtures of such minerals with fly ash or residue particles in previously uneconomic forms.

A further object of the invention is to provide such methods and apparatus for recovery of such minerals as fine particles of coal from discarded tailings from the washing of coal following mining operations.

Still another object of the invention is to provide such methods and apparatus capable of separating from useful minerals the less valuable ash particles in a form exhibiting self-compacting qualities, highly useful for back-filling of open or underground mining pits and excavations, filling voids of underground mines therefore reducing the probability of subsidence.

Yet another object of the invention is to provide such methods and apparatus usable with gold and other valuable minerals ore for cleaning and separating gold and other valuable mineral particles therefrom.

An additional object of the invention is to provide such methods and apparatus in which fine particles of useful minerals are separated from the water slurry after treatment leaving a water-ash-clay mixture exhibiting short settling times in ponds and settling basins, after which clarified wash water is ready for recycling or other uses.

It is also an object to eliminate the ga, e.g. ozygen, from the liquid slurry using the techniques of the invention.

Other objects of the invention will in part be obvious and will in part appear hereinafter.

The invention accordingly comprises the several steps and the relation of one or more of such steps with respect to each of the others, and the apparatus embodying features of construction, combinations of elements, and arrangements of parts which are adapted to effect such steps, all as exemplified in the constructions hereinafter set forth, and the scope of the invention will be indicated in the claims.

For a fuller understanding of the nature and objects of the invention, reference should be made to the following detailed description taken in connection with the accompanying drawings.

BRIEF DESCRIPTION OF THE DRAWINGS

FIG. 5 is a cross-sectional view of the second embodiment of the apparatus of the present invention showing the slurry running through the apparatus and filling the entire space between the two opposing trays;

FIG. 6 is a cross-sectional view taken along the 6—6 line of FIG. 5; and

FIG. 7 is a cross-sectional view taken along the 7—7 line of FIG. 5.

DETAILED DESCRIPTION OF THE PREFERRED EMBODIMENTS

Figure 1:
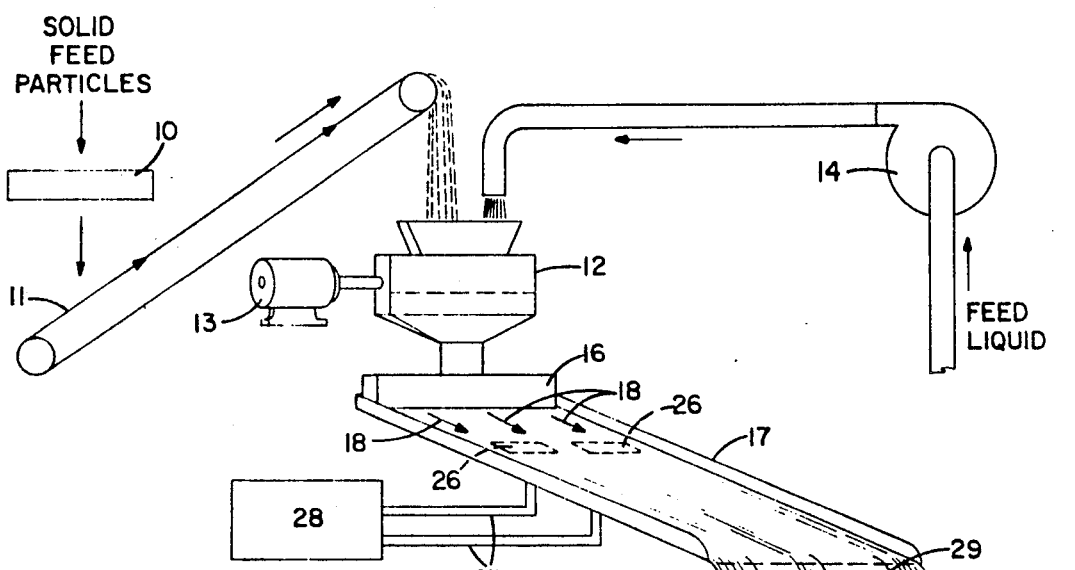
FIG. 1 is a schematic elevation view of the first embodiment of the apparatus employed in the methods of the present invention.

In the methods and apparatus of this invention for recovering fine mineral particles from crushed ore, a slurry is formed of feed water mixed with granulated ore solids, containing both mineral and ash constituents and other residues which are often firmly bound together by clay or water. After mixing, the slurry is delivered to a vibrator tray. The vibrator tray slopes downwardly and it is caused to vibrate by one or more ultrasonic transducers secured to its undersurface, creating vigorous standing wave patterns as the slurry travels by gravity down the slanting tray. In a second embodiment, a second vibratory tray overlays the first vibratory tray creating a reflective surface for increasing the effectiveness of the apparatus. The physical bonds between ash, residue and mineral particles are broken with surprising effectiveness by the ultrasonic vibratory energy, and the slurry carrying these types of solid particles passes to a physical separation step, such as a centrifuge or screen, where the mineral particles are efficiently separated from the slurry.

The ultrasonic standing waves created in the advancing sheet of slurry descending along the slanting tray result in de-agglomeration of the fine mineral particles from the particles of clay, ash, rock, shale or sulphur compounds, severing the bonds created by surface tension or opposite chemical charges.

After the physical bonds are severed by this ultrasonic treatment, physical separation steps for recovering the mineral particles from the slurry using such devices as a spiral, a cyclone, a shaker or vibrating table, a screen, a centrifuge, a settling tank or a screw classifier have been found to be highly effective, and the mineral particles are also found to be cleaned by the ultrasonic treatment. In the case of coal, this notably increases the number of BTUs recoverable per pound. The amounts of retained water in the recovered mineral constituent are also decreased as compared to other recovery systems, and fine pyritic sulphur constituents are decreased. Once the mineral constituents are treated as in the present invention, the minerals and residue follow more closely Stokes law in settling in calm water.

Recovery of Magnetic Particles

Similar treatment steps may be used for the recovery of magnetic material from ore, coal ash, recycled heavy media and other sources. A slurry of the feed material is passed over the ultrasonic vibrator tray for de-agglomeration and cleaning of the particles, and the slurry is then passed over a magnetic separator drum which removes the cleaned magnetic particles from the slurry.

Sedimentation and Water Clarification

Clarification of settling pond water and increased settling rates for fines are another valuable result of the methods of the present invention. In all cases the clarification of the pond water is greatly improved and in some cases the settling rates for the fines are increased as much as ten times.

Stagnant ponds of gangue, tailings, coal and other materials often contain gelatinous material which encases the small solid particles. Ultrasound disintegrates and separates the water-gel layer and also algae from these small solid particles.

The process is as follows: the stagnant water is pumped out of the pond over the ultrasonic processing tray and it then returns into a second pond. The cleaned particles, if not colloidal, will settle to the bottom of the pond. In mineral separation, the tailings will compact quickly, and occupy less space, and thereby increasing the useful life of the tailings pond.

The solid particles remaining after passing through the treatment of the present invention thus afford the advantage of a high degree of self-compaction, making the separated ash particles highly useful for back-filling of mining pits, which may be open or underground mining excavations. Even when valuable mineral particles are not sought, a water slurry of fly ash tailings and other fine material, passed over the ultrasonic vibrating tray of the present invention, may be delivered directly into a settling pond, a mine shaft, an open pit or other areas where it may be needed as a fill material, and sedimentation follows more rapidly than usual. The particles react in a pozzolanic manner, i.e., they resemble compacted volcanic ash.

Recovery of Fine Coal Particles

The "gob piles" remaining after conventional coal washing operations may contain from 25% to 50% coal particles. After this refuse material is crushed and then screened down to ¼ inch, it is ready for treatment in the apparatus of the present invention, permitting recovery of as much as 50% of the overall gob pile as useful coal.

Figure 2:
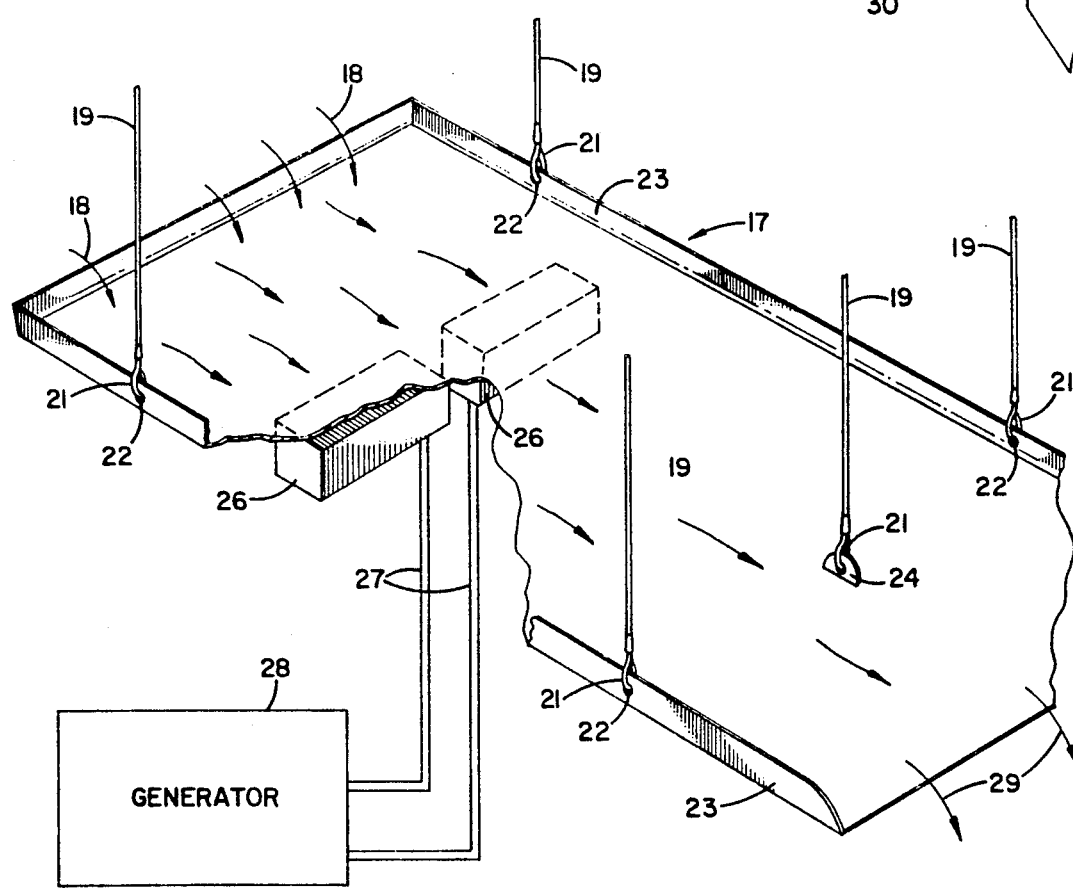
FIG. 2 is a partially schematic front corner perspective view showing the first embodiment of a vibrating tray employed in the methods and apparatus of the invention, partially broken away to show its construction.
Figure 3:
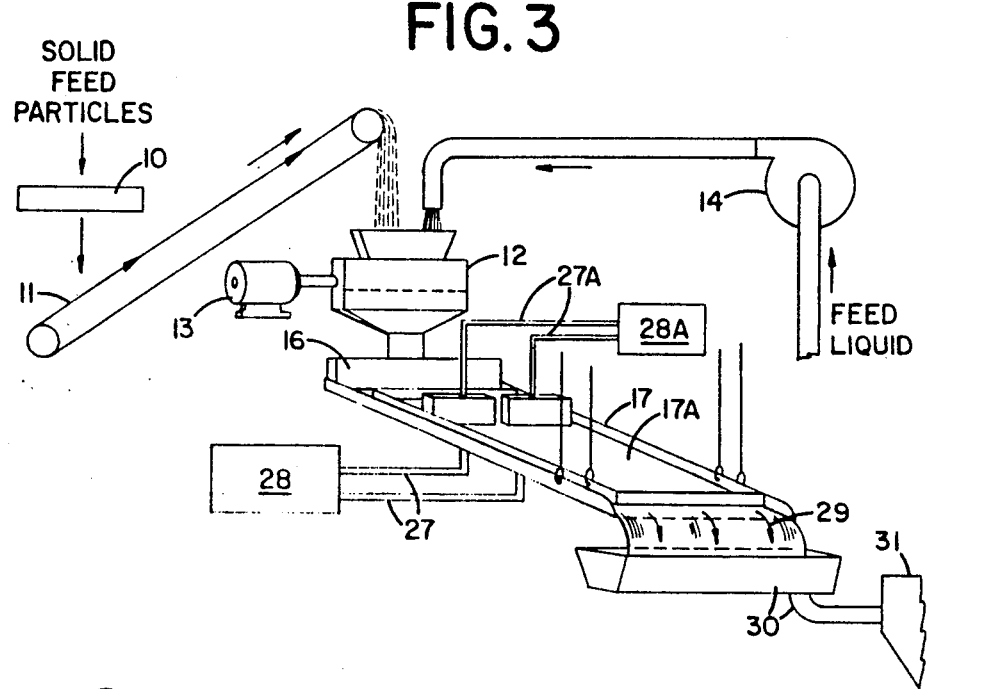
FIG. 3 is a schematic elevation view of the second embodiment of the apparatus employed in the methods of the present invention.
Figure 4:
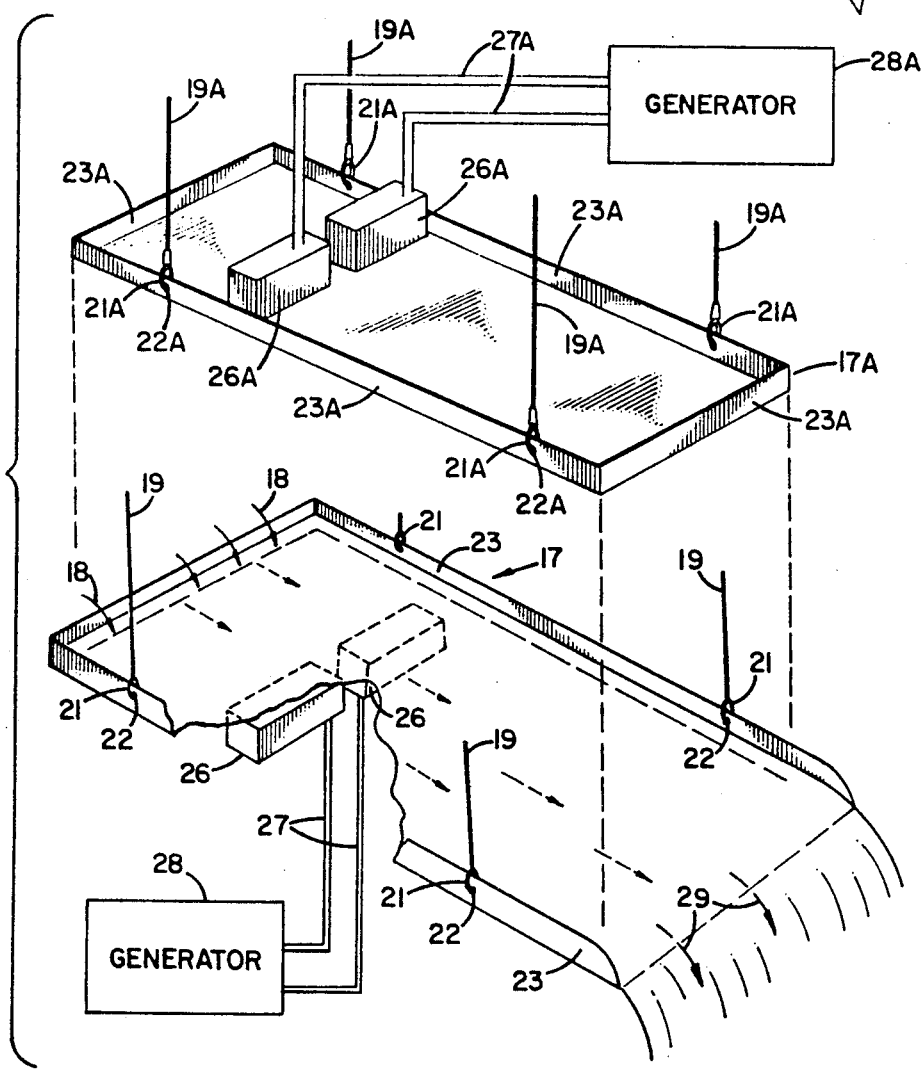
FIG. 4 is an exploded partially schematic front corner perspective view showing the second embodiment of a vibrating tray employed in the methods and apparatus of the invention, partially broken away to show its construction.

A first embodiment of the present ore beneficiation process for the recovery of useful coal particles from gob piles is illustrated in FIGS. 1 and 2. In FIG. 1, solid feed material is crushed and passed through a ¼ inch screen 10 and then delivered by such means as a conveyor 11 to the hopper of a mixer 12 driven by an electric motor 13. Feed water delivered by a feed water pump 14 is combined in mixer 12 with the crushed solid feed particles to form a slurry. This slurry from mixer 12 is spread laterally by a header 16, which distributes it evenly across the width of a wide, flat, elongated metal tray 17. The tray 17 can be approximately 1/16" thick and formed of stainless steel but can also be formed of other metals, ceramics, plastic or composites. The slurry 18 is preferably a pumpable, highly mobile liquid-like slurry. Arrows 18 show the slurry entering the upper entrance end of the tray 17 which is positioned slanting downward along a slight incline, at an angle between 5 degrees and 15 degrees from the horizontal, for example. The exact geometry of the tray 17 depends upon the desired flow volume of slurry and ultrasonic dwell time. A broader tray would provide for increased flow volumes while a longer tray would provide more ultrasonic dwell time for the same flow velocity.

As best seen in FIG. 2, tray 17 must be free to vibrate and is preferably suspended by flexible cable means 19 such as twisted stainless steel cables, or twisted or braided nylon cords, having terminal eye loops 21 formed in their ends, engaging suitable support apertures 22 formed in upturned flanges 23, extending along the edges of tray 17, or in one or more upwardly extending tab flanges 24, positioned centrally between the edges of tray 17, as indicated at the right-hand side of FIG. 2.

Shown in FIG. 2 are two transducers 26 secured to the underside of tray 17. These transducers are preferably so-called "submersible" magnetostrictive transducers enclosed in sealed housings brazed to the underside of the vibrator tray and connected by pairs of conductors 27 to a suitable ultrasonic generator 28 or power supply energizing transducers 26 to deliver vibratory energy at frequencies ranging between about 10 to 50 khz to tray 17.

While a larger plurality of transducers may be employed, a pair of transducers 26 extending laterally across the major portion of the width of tray 17 at a point between about 10% and about 40% of the length of the tray, measured from the infeed entrance end where slurry 18 is introduced to the tray, toward the delivery end where similar arrows 29 show the treated slurry leaving tray 17 and descending into a hopper-conduit 30 on its way to separator 31. Operating at this intermediate position along the length of tray 17, the transducers 26, when energized, produce a shimmering vibratory wave pattern of vibrating particles which can easily be observed in the thin, shallow slurry sheet as it descends along the slanted tray. The line of transducers 26 mounted near the end of the tray 17 provides directional pressure waves or ridges within the slurry 18, that is, pressure ridges that are perpendicular to the direction of flow of slurry 18. One means of providing this directionality is to mount rectangular transducers 26 whose long dimension parallels the desired pressure ridges. Where more than one transducer is lined across the tray, the reciprocating displacement is generally precisely synchronized in phase at the same frequency to avoid cancelling out the parallel standing waves across the tray. Magnetostrictive transducers readily lend themselves to such phase control By confining the ultrasonic vibratory energy in the shallow slurry sheet, preferably from about 10 mm to about 40 mm in depth, it is not dissipated or attenuated as it would be in a deeper body of liquid.

Small agglomerated clumps of ore can be observed traveling in the flowing slurry along the downward slanted tray, bouncing and vibrating as they become progressively smaller, with the vibratory energy progressively separating the constituent particles from each other to form smaller individual particles. The particles will spurt upwardly as they pass each pressure ridge. The unrestricted freedom of tray 17 to vibrate and flex because of its suspension on cables 19 creating the desired "flexural cavitation" is believed to contribute substantially to the effectiveness of the processes of the invention.

The second embodiment of the vibratory tray apparatus of the present invention is illustrated in FIGS. 3-7. The second embodiment encompasses identical components to the first embodiment and those identical components have been identified with reference numerals equivalent to those found in the first embodiment. The major difference in the second embodiment is that a second vibratory reflection tray 17A has been superimposed over or above the first tray 17 to create a reflective surface for the ultrasonic energy in the slurry 18. The reflection tray 17A can be made of materials similar to those used to form the first tray 17 and is slightly smaller than the first tray 17. The tray 17A is suspended by flexible cable means 19A which can be twisted stainless steel cables, or twisted braided nylon cords, having terminal eye loops 21A extending through apertures 22A formed in upturned flanges 23A. It should be noted that the centrally-located flange 24 and its corresponding cable on the first tray 17 has been eliminated.

If desired, the vibrating tray 17A can have two or more transducers 26A secured on the upper side thereof for introducing ultrasonic vibratory through tray 17A into the slurry 18. These transducers 26A are "submersible" magnetostrictive transducers enclosed in sealed housings brazed to the upper side of the vibratory tray 17A. The transducers 26A can be connected to a suitable ultrasonic generator or power supply 28A or, alternatively, to ultrasonic generator 28. It should be appreciated that a varying number of transducers 26 and 26A can be placed in a variety of patterns on their respective trays.

As best seen in FIGS. 5-7, the spacing between the trays 17 and 17A is such that the inflow of slurry 18 from the mixer 12 fills the entire space there between so the ultrasonic energy from the trays 17 and 17A is transferred directly into the slurry 18. The effectiveness of the device would obviously be diminished if the level of slurry 18 was diminished to the point where a gap appeared below the tray 17A. It should be appreciated that the use of the reflective tray 17A allows the depth of the liquid slurry 18 to be increased approximately up to 80 mm.

It should be also appreciated that the transducers of the second embodiment can be run at different and/or superimposed frequencies or intensities. Alternatively, the transducers can be placed in different zones along the length of the trays to enable zone treatment at different frequencies and/or intensities. It is also possible to deactivate the transducers on one of the trays so the tray acts merely as a reflection tray. It is also contemplated that an enclosed rectangular conduit can be formed by the two trays in the second embodiment with transducers on the upper and lower surfaces thereof. The trays would be connected together utilizing rubber or other material that would not transfer vibrations between the trays. The conduit could also have other shapes such as round, oblong, etc. with the transducers suitably placed thereon.

The second embodiment permits use of increased slurry depths as the scattering attention of the vibratory waves is counteracted by upper vibrating plate-reflector. Tests run on the second embodiment indicate a 10-15% improvement in separation performance over the first embodiment with the addition of the reflector tray 17A.

In either of the embodiments, the transducers 26 and 26A can be powered in such a way to achieve amplitude and/or frequency modulation. A low powered oscillatory circuit is used to obtain the desired modulation.

The advantages of the present invention should be apparent from the prior description of the preferred embodiments. The ultrasonic vibratory energy breaks the surface tension bonds between mineral particles and ash/clay particles, and any air bubbles, gels, slimes or algae causing particles to adhere together. This process may be called microscopic scrubbing of the particles, and it produces unusually clean particle surfaces, stripped of foreign material, and carrying much less moisture than before.

This microscopic scrubbing action is believed to account for many of the unexpected advantages of the ultrasonic vibrator tray processes. For example, with the surface tension removed, the dewatering rate and the sedimentation or settling rate for resulting fine particles are notably improved after the ultrasonic vibrator tray treatment of these slurries. This leads to rapid clarification of settling basins and pond water because of this enhanced clean separation of mineral particles from each other and from ash particles, gel, algae and the like. The rate of screening these clean fine particles is also improved following this ultrasonic vibrator tray treatment of such slurries, and clogging buildups of fines on screens is greatly reduced when the fine particle surfaces are cleaned in this manner.

Self compaction of these ultrasonic scrubbed fine particles, unimpeded by air bubbles, gel particles or other foreign coatings, leads to denser filter cakes or sludge layers. It will be understood that the rates of screening, filtration, conveying, heat transfer and drying of the resulting scrubbed fine particles are all enhanced by these processes of the invention and the effective extraction rates or percentages of recovery of fine coal particles, heavy metal particles or precious metal particles from crushed ore slurries are significantly improved. Leaching rates and removal of sulphur in pyrite form from fine coal particles are also improved.

Chemical additives such as flocculating agents are made significantly more efficient by these processes. For example, when they are used with the processes of this invention, the normal amounts of flocculants may be reduced by as much as 80% to 95% without adversely affecting the operating results.

In addition to using the apparatus and processes of the present invention for coal particles, other types of particulates can be treated. For example, (1) the tar sands can be used as the particulate material and separated into its constituents; (2) mineral particles can be separated from salt water; and (3) mineral particles can be separated from raw sewage. In addition, various chemical additives can be added to the slurry before or after treatment to leach, amalgamate or agglomerate the desired particles therefrom. For instance, various organic solvents or the elements mercury or gallium can be added for amalgamation or leaching purposes. Also, enzyme activated carbon such as those available from Enzyme Activated Carbon, Inc., 1715 First Avenue, Scottsbluff, Neb. (See U.S. Pat. Nos. 4,174,223 and 4,529,701) can be added to agglomerate metal particles and other particles such as phosphates and potash.

It should be recognized that the transducers give off heat which then elevates the temperature of processed liquids and slurries. In some applications, this is undersirable. With "flexural cavitation", however, these liquids can be introduced onto the cavitating tray downstream from the transducers in an area distant from the heat to provide cool cavitation mixing or separation. The active portion of the tray would also facilitate application of controlled cooling or heating during cavitation.

Finally, subsequent operations such as centrifugal separation steps are made more efficient when they are performed on the slurries treated in the ultrasonic vibrator tray processes of this invention It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described the invention, we claim:

1. The process of treating with vibratory energy a flowable slurry of particulate materials mixed in a liquid comprising the steps of
    providing a first laterally extended downwardly elongated treatment zone bounded by an adjoining flat boundary surface and a laterally extended downwardly elongated reflection surface located over the treatment zone,
    coupling vibratory energy through said boundary surface to cause the slurry to vibrate in a direction substantially perpendicular to its length and to its width at a frequency between about 10 kHz and about 50 kHz, while the slurry flows downward through the downwardly elongated treatment zone toward a lower exit end thereof,
    and thereafter conducting the treated slurry to a separation zone where the particulate materials are separated from the liquid.

2. The process defined in claim 1 wherein the treatment zone is downwardly elongated in a slanting diagonal direction relative to the vertical, and the boundary surface underlies the treatment zone.

3. The process defined in claim 2 wherein the slanting treatment zone descends at an angle between about 5 degrees and about 25 degrees from the horizontal.

4. The process defined in claim 1 wherein all of the steps are performed simultaneously and continuously, whereby a continuous slurry treatment is achieved in the treatment zone.

5. The process defined in claim 1 wherein the particulate materials include mineral fines.

6. The process defined in claim 1 wherein the particulate materials include mineral fines and ash particles.

7. The process defined in claim 6 wherein the mineral fines are fine coal particles.

8. The process defined in claim 1 wherein the liquid is a water solvent containing a substance chosen from a group consisting of organic solvents or the elements mercury and gallium.

9. The process defined in claim 7 wherein the particulate materials also include clay particles.

10. The process defined in claim 1 further including the step of coupling vibratory energy through the elongated reflection surface.

11. The process defined in claim 1 wherein the particulate materials include tar, sand and clay particles.

12. The process defined in claim 1 wherein the particulate materials are mineral particles and the liquid is salt water.

13. The process defined in claim 1 wherein the particulate materials are minerals in sewage.

14. The process defined in claim 1 wherein the particulate materials includes metal particles.

15. The process defined in claim 14 wherein the metal particles are precious metal particles.

16. The process defined in claim 14 further including the step of adding a chemical additive to the liquid slurry.

17. The process defined in claim 14 wherein the chemical additive permits amalgamation of the metal particles.

18. The process defined in claim 1 further including the step of adding an enzyme to the slurry.

19. The process defined in claim 18 wherein the enzyme is an enzyme activated carbon.

20. The process defined in claim 1 wherein the slurry is degassed during treatment thereof.

* * * * *